United States Patent
Krasnansky

(10) Patent No.: US 7,142,605 B2
(45) Date of Patent: Nov. 28, 2006

(54) METHOD TO TRANSFER DATA WITHOUT A CLOCK OR STROBE SIGNAL

(75) Inventor: Keith Krasnansky, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 528 days.

(21) Appl. No.: 09/945,684

(22) Filed: Sep. 5, 2001

(65) Prior Publication Data

US 2003/0091117 A1 May 15, 2003

(51) Int. Cl.
*H04L 25/00* (2006.01)
*H04L 27/38* (2006.01)

(52) U.S. Cl. ...................... 375/257; 375/260
(58) Field of Classification Search .......... 375/257, 375/260, 369, 293; 370/489, 85.1; 711/167; 341/55; 714/798
See application file for complete search history.

(56) References Cited

U.S. PATENT DOCUMENTS

| 4,208,650 | A | * | 6/1980 | Horn | 714/798 |
|---|---|---|---|---|---|
| 4,689,740 | A | * | 8/1987 | Moelands et al. | 713/600 |
| 4,928,289 | A | * | 5/1990 | Dingeman | 375/293 |
| 5,408,501 | A | * | 4/1995 | Cornaby | 375/260 |
| 6,018,794 | A | * | 1/2000 | Kilpatrick | 711/167 |
| 6,167,495 | A | * | 12/2000 | Keeth et al. | 711/167 |
| 6,249,827 | B1 | * | 6/2001 | James et al. | 710/58 |
| 6,542,976 | B1 | * | 4/2003 | Barth et al. | 711/167 |

* cited by examiner

*Primary Examiner*—Emmanuel Bayard
*Assistant Examiner*—Lawrence B. Williams
(74) *Attorney, Agent, or Firm*—Steven A. Shaw; W. James Brady; Frederick J. Telecky, Jr.

(57) ABSTRACT

A method of communicating a data bit between memory devices is disclosed, having the steps of: indicating a first value of the data bit by transitioning, between state values, a first signal applied to a first communication line interconnecting the devices; and indicating a second value of the data bit by transitioning, between the state values, a second signal applied to a second communication line interconnecting the devices. Only one of the first and second signals may transition between the state values at any one time.

15 Claims, 3 Drawing Sheets

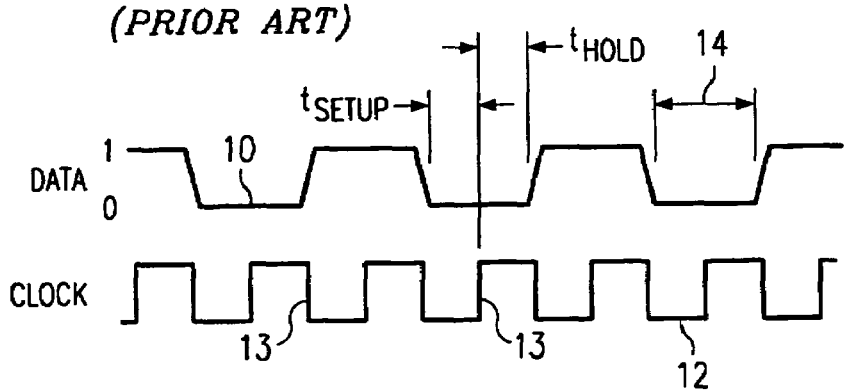
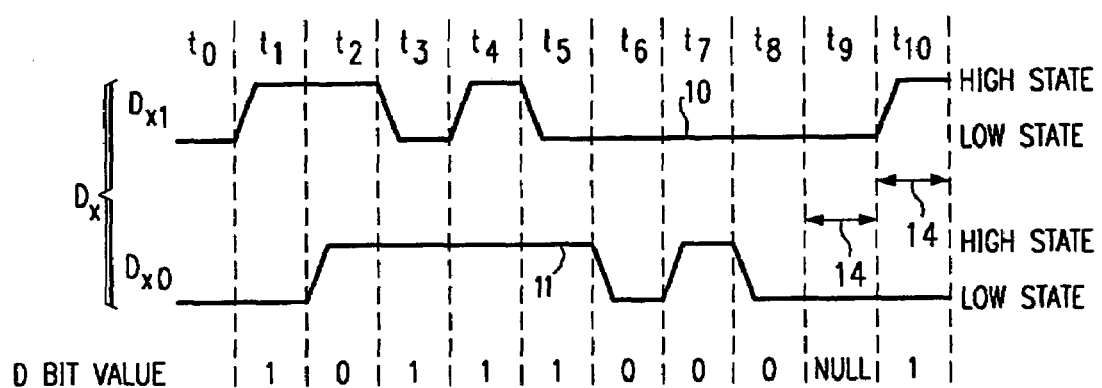

METHOD TO TRANSFER DATA WITHOUT A CLOCK OR STROBE SIGNAL

FIELD OF THE INVENTION

The invention relates to communicating information between circuits without using a clock or strobe signals to indicate when the destination device should latch the communicated information.

BACKGROUND OF THE INVENTION

Data is presently transferred between circuits using data signals and a separate clock signal, as illustrated in FIG. 1. During the transfer, the data signal 10 applied to the data bus line must remain valid for a predefined period before and after a transition 13 of the clock signal 12, at the destination of the data transfer. The clock signal transition 13 informs the receiving memory device to read the transferred data 1 during this period of signal validity 14. The required period of data validity before the clock signal transition 13 is referred to as the setup time $t_{setup}$ and the required period of data validity after the clock signal transition 3 is referred to as the hold time $t_{hold}$.

Generally, to increase the performance of integrated circuits, it is necessary to increase the clock rate and the density of the integrated circuitry. The increased performance of integrated circuits creates several problems with the traditional means of data transfer. The increased clock rate is associated with an increased data transfer rate and this increased data transfer rate necessarily reduces both the setup and hold times. A reduced period of data validity makes it increasingly difficult to synchronize the transition of the clock signal with the setup and hold times at the destination device. The increasing density of integrated circuitry requires the use of smaller circuit traces that have a higher resistance than do larger traces. This increased resistance creates greater propagation delays in the transfer of data and clock signals between the source and destinations devices. These delays may vary depending upon the layout, size, and length of the traces connecting the source and destination devices. Because The propagation delay of one line may be different from another line, a signal generated on one line may take longer to travel to its destination than a simultaneously generated signal on another line. This variable delay time, makes it difficult to use a global clock signal to synchronize all of the data transfers on a printed circuit board or a chip with multiple circuits or on integrated circuit. Delays incurred by the clock signal may not be identical to the delays incurred by data signals, making it difficult to synchronize the clock signal transition with the setup and hold times at the destination device. The electrical properties of integrated circuit materials change with changes in temperature. These changing properties create variations in the signal delays that compound the difficulty of synchronizing clock and data signals over the range of operating temperatures for a circuit.

Presently, the above-described problems can be addressed. The propagation delays for the data and clock signals may be made nearly identical by collocating the source and destination points for these signals and routing the signal traces along nearly identical paths. Alternatively, an iterative process of modeling the performance of the integrated circuit and incrementally adjusting the signal routing may be used to achieve the desired synchronization between the data and clock signals.

Solutions are difficult and expensive to implement. Neither solution is desirable and neither solution reduces the effect of the above-described problems as the clock rate and circuit densities are increased.

SUMMARY OF THE INVENTION

The present invention solves the above-described problems for communication on a board, within an integrated circuit as well as for other non-integrated applications, such as circuit-to-circuit communication on a printed circuit board or any other data transfer medium. The present invention supports data transfers at a faster rate than can be accomplished by prior art methods; eliminates errors caused by the skew between the clock and data signals; eliminates the need for a clock or any other strobe signal to transfer high-speed data; and eliminates a clock that must transition at twice the data transfer rate.

The circuits may be on a common PC board or on a chip. The present invention replaces each data line of communication bus with a data line pair. Communicating a first bit value is accomplished by transitioning between state values, a signal applied to a first communication line of the line pair. Communicating a second bit value is accomplished by transitioning a signal applied to a second communication line of the line pair.

The present invention communicates data bits between devices on a pair of data lines where a transition of a first data line of the pair indicates a first value of the data bit, and a transition on a second data line of the pair indicates a second value of the data bit. Only one of the first and second signals may transition between the state values for the data bit communication at any one time. Because data is transferred each time one of the two data lines transitions, data transfer is not dependent upon a clock signal.

BRIEF DESCRIPTION OF THE DRAWINGS

Preferred embodiments of the inventions are discussed hereinafter in reference to the drawings, in which;

FIG. 1—illustrates a prior art method of transferring data;

FIG. 2—illustrates two signal lines used to convey a single bit of information;

DETAILED DESCRIPTION OF THE INVENTION

Figure 3:
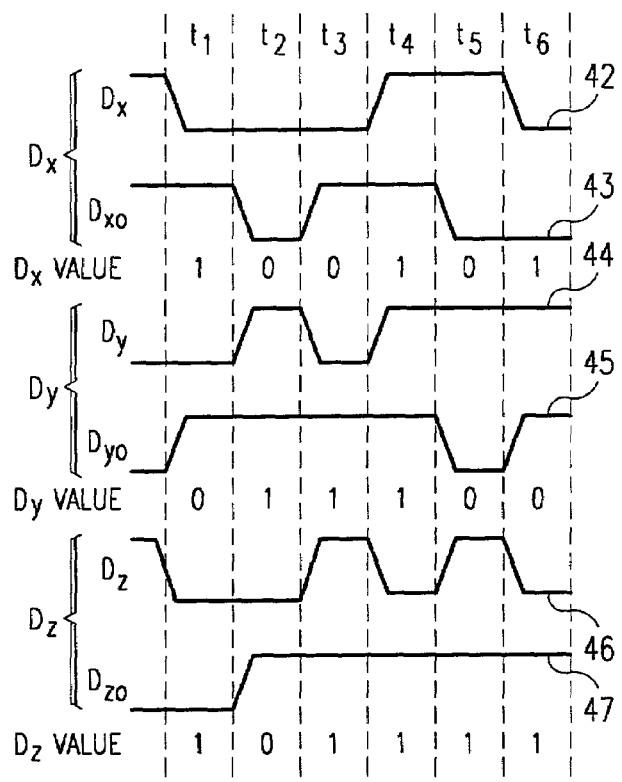
FIG. 3—illustrates a parallel data bus structure that communicates three bits of information.

FIG. 2 illustrates two signal lines, $D_{x0}$ and $D_{x1}$, used to convey a single bit of information $D_x$. The present method uses the transitions occurring on the data lines alone to inform the destination device that a bit of communicated data is valid. The state transition occurring on the signal line itself causes the communicated bit value to be latched into the destination device. No separate clock signal is used at all. The bit periods $t_o$–$t_n$ are clock independent.

For every bit period 14 in which an information bit is communicated, one and only one of the two signal lines $D_{x0}$ and $D_{x1}$ transitions between state values. Also, the transitioning signal line can transition only once during a single bit period. A state transition occurring on signal line $D_{x0}$ communicates a bit value of zero. When a state transition occurs on signal line $D_{x0}$ during a bit period 14, no state change may occur on signal line $D_{x1}$ and no additional state change is permitted on signal line $D_{x0}$ during the same bit period 14. A state transition occurring on signal line $D_{x1}$ communicates a bit value of one. When a state transition occurs on signal line $D_{x1}$ during a bit period 14, no state change may occur on signal line $D_{x0}$ and no additional state change is permitted on signal line $D_{x1}$ during the same bit period 14. A state transition may be either a change form a high to a low state or from a low to a high state. When no state change occurs on either of signal lines $D_{x0}$ or $D_{x1}$, no bit value is communicated for bit $D_x$. The operation of the invention is described more fully below, by way of the example illustrated in FIG. 2.

In the illustrated exemplary embodiment, during an initial period $t_0$, both signal lines have a low-state value. At the beginning of bit period $t_1$, signal line $D_{x1}$ transitions from the low state to a high state and then remains at this state value for the remaining portion of the bit period $t_1$. No transition occurs on signal line $D_{x0}$ in bit period $t_1$. Therefore, the information communication for data bit $D_x$ during bit period has a bit value of one. At the beginning of bit period $t_2$, signal line $D_{x0}$ transitions from the low state to a high state and then remains at this state value for the remaining portion of the bit period $t_2$. No transition occurs on signal line $D_{x1}$ in bit period $t_2$. The information communicated for data bit $D_x$ during bit period $t_2$ has a bit value of zero.

The embodiment of FIG. 2 illustrates that: one and only one transition may occur on a signal line 10, 11 during a single bit period 14; when one of the two signal lines 10, 11 for the communicated information bit $D_0$ 12 experiences a state transition, the other signal line may not also experience a state change in the same bit period 14; a maximum of one information bit value is communicated per bit period using the two signal lines $D_{x0}$ and $D_{x1}$ associated with the information bit $D_x$; and that the generation of bit data is not dependant upon a clock or trigger signal synchronized with the receiving circuit.

A transition from a high to a low state on a particular signal line communicates the same bit value as a low to high transition on the same signal line. For example a transition on signal line $D_{x1}$ always communicates a bit of value of one for data bit $D_x$, $t_4$, and $t_5$ are one, one, and one. Bit periods $t_2$, $t_6$, $t_7$, and $t_8$ illustrate a set of transitions occurring on signal line $D_{x0}$ and the communicated bit values are zero, zero, and zero.

No state transition occurs on either of the signal lines during a bit period $t_9$. Therefore, no bit value 25 is communicated for information bit $D_x$ in this bit period $t_a$. The next transition occurs in bit period $t_{10}$, where a bit value of one is communicated. Therefore, the sequence of communicated information for bit periods $t_8$, $t_9$, and $t_{10}$ has bit values of zero, null value, and one, respectively.

Table I, below, lists the relationship between the signals $D_{x1}$ and $D_{x0}$ on lines 10 and 11, during a bit period $t_i$ 14, and the communicated value 25 for the data bit. Combinations of activities on signal lines 10 and 11 other than those listed are disallowed.

TABLE I

| Signal Line $D_{x0}$ Activity | Signal Line $D_{x1}$ Activity | Data Value Communicated |
| --- | --- | --- |
| no change | no change | null value |
| transition from low to high state | no change | 0 |

TABLE I-continued

| Signal Line $D_{x0}$ Activity | Signal Line $D_{x1}$ Activity | Data Value Communicated |
| --- | --- | --- |
| transition from high to low state | no change | 0 |
| no change | transition from low to high state | 1 |
| no change | transition from high to low state | 1 |

In an applied use of the invention, the signal lines $D_{x0}$ and $D_{x1}$ are routed next to each other and follow the same path around the circuit. The traces for these two signal lines have the same size and are made of the same material, so that any variations in delay will be common to both signals. Following these rules, the relationship between the transitions of $D_{x0}$ and $D_{x1}$ at the data source will be preserved at the data destination.

In practice, a plurality of data bits $D_x$ $D_y$ $D_z$ (as illustrated in FIG. 3) simultaneously communicated between the data source and destination. When multiple signals, which each communicate a single bit of information, are conveyed simultaneously, a separate pair of signal lines are being used for each of the multiple signals. Each of these separate pairs of signal lines operate in the manner described above.

FIG. 3 illustrates a parallel data bus structure of the present invention at the data source that communicates three bits of information during each bit period. The three information bits are identified as $D_x$, $D_y$, and $D_z$. The value of information bit $D_x$ is communicated by signal lines $D_{x0}$ and $D_{x1}$, the value of information bit $D_y$ is communicated by signal lines $D_{y0}$ and $D_{y1}$, and the value of information bit $D_z$ is communicated by signal lines $D_{z0}$ and $D_{z1}$. Table II, below, lists the communicated information on signal line pairs $D_x$, $D_y$, and $D_z$ that is associated with the state transitions on signal lines $D_{x1}$, $D_{x2}$, $D_{y1}$, $D_{y2}$, $D_{z1}$ and $D_{z2}$ for bit periods $t_1$–$t_6$, respectively. In bit period $t_1$ only signal line $D_{z1}$, $D_{y0}$, and $D_{z1}$ experience a state change, as indicated in Table 2 by the abbreviation "C" in the respective columns for these signals lines. The signals applied to signal lines $D_{x0}$, $D_{y1}$, and $D_{z0}$ remain unchanged in bit period $t_1$, as indicated in Table 2 by the abbreviation "NC" in the respective columns for these signal lines. Therefore, the communicated information for this bit period 30 is the values of one, zero, and one for data bits $D_x$, $D_y$, and $D_z$, respectively. The communication of information for data bits $D_x$, $D_y$, and $D_z$ using the parallel data bus structure of FIG. 3 operates similarly for the other bit periods $t_2$–$t_6$. As the chart illustrates, the three bit words in order are: 101; 010; 011; 111; 001; 101.

TABLE II

| Bit | $D_{x1}$ | $D_{x2}$ | $D_{y1}$ | $D_{y2}$ | $D_{z1}$ | $D_{z2}$ | $D_x$ | Dy | $D_z$ |
| --- | --- | --- | --- | --- | --- | --- | --- | --- | --- |
| $t_1$ | C | NC | NC | C | C | NC | 1 | 0 | 1 |
| $t_2$ | NC | C | C | NC | NC | C | 0 | 1 | 0 |
| $t_3$ | NC | C | C | NC | C | NC | 0 | 1 | 1 |
| $t_4$ | C | NC | C | NC | C | NC | 1 | 1 | 1 |
| $t_5$ | NC | C | NC | C | C | NC | 0 | 0 | 1 |
| $t_6$ | C | NC | NC | C | C | NC | 1 | 0 | 1 |

Although each independent bit $D_x$, $D_y$ and $D_z$ for each frame of the data generated at the data source may be generated simultaneously, for high-speed communications, there may exist a degree of time skew between the arrival of each of the signal transitions at the destination port, as illustrated in FIG. 4. A small skew buffer, commonly referred to as an elastic buffer or FIFO buffer, may accommodate this skew.

FIG. 4 illustrates the timing on the parallel bus structure of the present invention at the data receipt end of the data generated in FIG. 3. The time periods $t_{10}$–$t_{16}$ illustrated in FIG. 4 are designated to demonstrate the potential delay in reception on the sets of parallel lines $D_x$, $D_y$ and $D_z$. The time period $t_{10}$ does not have a temporal relationship to time period $t_1$–$t_6$. In fact, the first data bit on lines $D_x$ and $D_z$ may be received during any time period after $t_1$ including $t_2$–$t_6$.

As can be seen from the timing diagram of FIG. 4, the line with the least delay is data line pair $D_x$ and the lines with the most delay are the lines of data line pair $D_y$. In fact it takes the data on data line pair $D_y$ twice as long to reach the destination as it does the data on data line pair $D_x$. The data on data line pair $D_z$, as illustrated, requires 50% greater time to reach the destination than the data on data line pair $D_x$. According to the teachings of the present invention, it is not necessary that all bits $D_x$, $D_y$ and $D_z$ of a single 3 bit word reach the destination register simultaneously. Further, although a series of time frames $t_1$–$t_6$ and $t_{10}$–$t_{16}$ are illustrated, these time frames do not necessarily correspond to a clock timing signal. The present invention can operate with each of these time slots corresponding to the clock signal or a clock signal can be equal to several of these time slots, for example, $t_1$–$t_3$. Alternatively, these time slots may have a lower frequency than the clock signal. In this manner, data generated faster or slower than the clock frequency can be accommodated by the data line pairs of the present invention.

As illustrated in FIG. 4, the data bit "one" arrives on the $D_x$ data line pair half a time slot ahead of the arrival of the data bit "one" on the $D_z$ data line pair. A half frame after, the bit "zero" arrives on the $D_y$ data pair simultaneous with the second data bit "zero" on the $D_x$ data pair. In the next time slot, $t_{12}$, another "zero" data bit arrives on the $D_x$ data pair simultaneous with the arrival of the "zero" data bit on the $D_z$ data pair. The arrival of the remaining data bits illustrated as generated in FIG. 3, is illustrated in FIG. 4.

Figure 5:
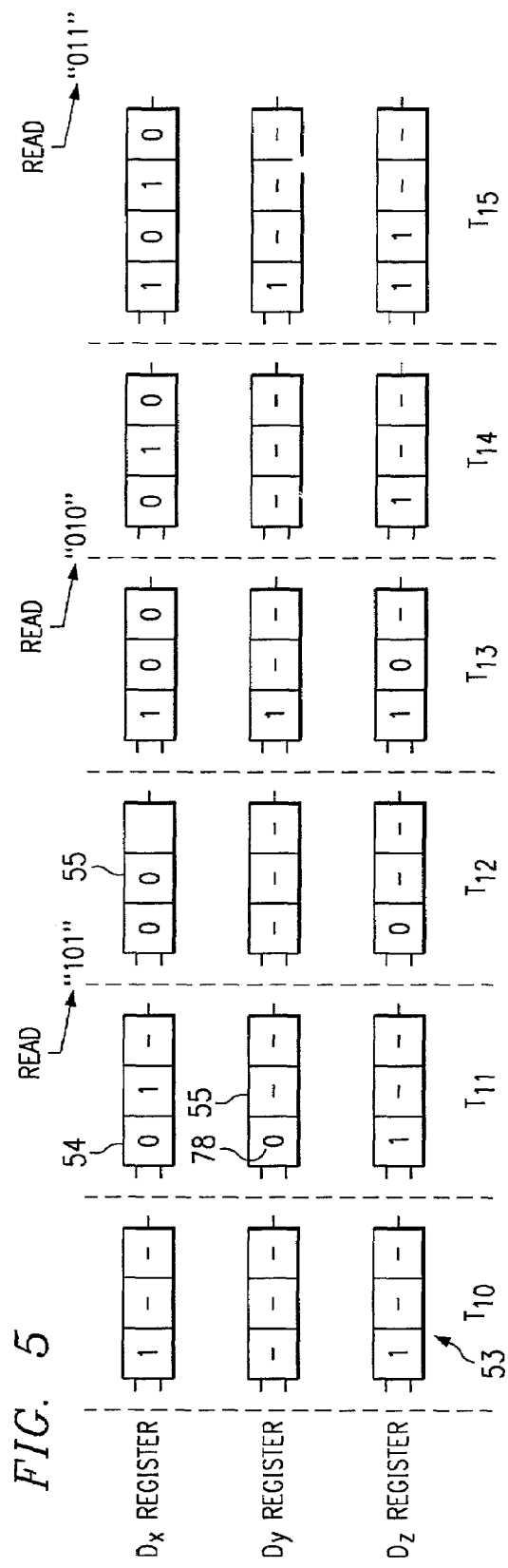
FIG. 5—illustrates the operation of an exemplary embodiment of buffer illustrated in FIG. 4.

FIG. 5 illustrate a set of typical first-in-first-out (FIFO) buffers. Each of the buffers acts independently, however data is only read out of the set of buffers when all of the buffers indicate they contain at least one valid data bit. Each of the FIFO buffers for each bit is independent. The non-empty signals from all the FIFOs are connected together in an AND logic manner so that a global not-empty signal must be present to indicated to the destination device when a complete word may be read. This is illustrated in FIG. 5 where the read operation occurs only after each of the $D_x$ register, $D_y$ register and $D_x$ register have at least one bit of valid data. As illustrated, the $D_x$ register and $D_z$ register obtain a valid bit of data during time interval $t_{10}$ even though the $D_z$ register receives this valid bit of data slightly delayed in time from the receipt in the $D_x$ register. During time period $t_{11}$ the $D_x$ register receives a second bit of valid data and the $D_y$ register receives its first bit of valid data. Therefore, the read operation illustrated FIG. 5 can occur at the end of time period $t_{11}$ and the 3 bit word "one zero one" is read out. During time period $t_{12}$, the $D_z$ register receives a bit of data and the $D_x$ register receives a bit from data. The $D_y$ register remains empty and therefore no read can occur at the end of time frame $t_{12}$. During time frame $t_{13}$ all three registers receive a bit of data and a read operation can occur. In this instance, the three bit word "zero one zero" is read from the three registers. This operation continues as illustrated, receiving data without the need for a clock signal to clock in each bit of data. The group of FIFO registers need to be configured to accommodate the storage capacity for data bits which arrive ahead of other data bits from a common word. In that manner, each of the data bits would be present when the word is to be read from memory.

Figure 4A:
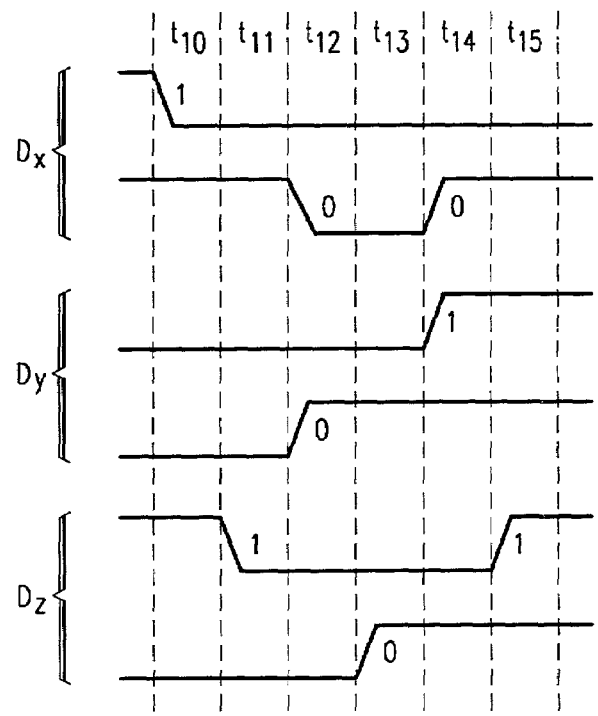
FIG. 4—illustrates an elastic buffer used to compensate for the propagation delay skew at a destination port.

Alternatively, as illustrate in FIG. 4A and FIG. 5A, the bits $D_x$, $D_y$ and $D_z$ of the first 3 bit word are transmitted during time interval $t_1$ and are generated and sent from the source simultaneously. However, the receipt of bit $D_z$ may be delayed by a half cycle as illustrated by receipt of $D_z$ during time frame $t_{11}$. The total time of time frames $t_{10}$ and $t_{11}$ is equal to the length of time frame $t_1$. Therefore, at time frame $t_{12}$ the second data bit from data line $D_x$ is arriving as is the first data bit on data line $D_y$ which was delayed by an entire time frame from the first data bit on line $D_x$. The second data bit on line pair $D_z$ arrives during time frame $t_{13}$ and the second data bit from data pair $D_y$ arrived during time frame $t_{14}$. Because each set of bits is generated simultaneously, and because the delay between the lines is consistent, the data bits will continue to be received in this offset and overlapping pattern.

FIG. 5 illustrates how the FIFO buffers are filled and then read out while receiving the staggered delay bits on lines $D_x$, $D_y$ and $D_z$.

It is of particular importance to note that the invention overcomes the problems created by propagation delay skew in synchronous communication. Regardless of the skew length cause by propagation delay between the source and destination ports, the FIFO buffer array will operate to realign the bits into parallel form so that they can be read simultaneously to form a word corresponding to the word generated at the source. For example, if the propagation delay skew between the pair of lines representing the $D_x$ and $D_y$ bits is ten nanoseconds and the bit period between subsequent bit transmissions on each of these two line pairs is two nanoseconds. The first bit in a sequence transmitted on the $D_x$ line pair will always arrive before the second bit in a sequence. Similarly, the first bit in the sequence transmitted on the $D_y$ line pair will always arrive before the second bit in the sequence.

Figure 6:
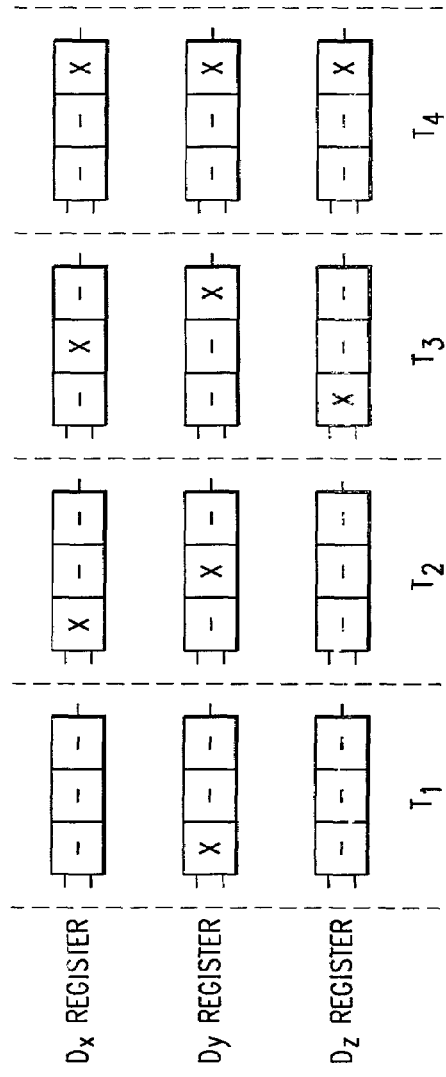
FIG. 6—illustrates the operation of an alternative embodiment for the buffer illustrated in FIG. 4.

FIG. 6 illustrates a second alternative embodiment for a FIFO buffer used to compensate for the propagation delay skew at a destination of the communication. Buffer 60 is comprised of a series of (3×1) first-in-first-out (FIFO) memory registers. Register $D_x$ receives the value of the $D_x$ bit, register $D_y$ receives the value of the $D_y$ bit, and register $D_z$ receives the value of the $D_z$ bit.

In the example illustrated, the signal lines communicating the $D_x$ bit have a slight propagation delay with respect to the signal lines communicating the $D_y$ bit. Additionally, the signal lines communicating the $D_z$ bit have a slight propagation delay with respect to the signal lines communicating the $D_x$ bit. Data bits $D_x$, $D_z$ are communicated by the source at the same time but arrive at the destination port at different time due to the varying propagation delays of the traces conveying the signals. However, each data bit $D_x$–$D_z$ is received within the allotted bit period. To ensure the plurality of simultaneously communicated bit values are received in the same bit period, the sum of the buffer length periods $t_1$–$t_4$, must be less than a bit period.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claims is:

1. A method of clock-independent communication of data bits between devices, comprising the steps of:
   providing a pair of data signal lines interconnecting said devices, for transmission of said data bits;
   indicating the transmission of a data bit by a state change on one of said two data signal lines, independent of any clock signal;
   indicating that a value of said transmitted data bit is one by state transitions between values occurring on a first one of said pair of data signal lines interconnecting said devices; and
   indicating that a value of said transmitted data bit is zero by said state transitions between values occurring on a second one of said pair of data signal lines interconnecting said devices, wherein
   the state transitions between values only occur on one of said first and second data signal lines for said data bit communication at any one time, each such transition indicating the transmission of a data bit.

2. The method of claim 1, further comprising the step of:
   sequentially communicating a plurality of data bits, wherein
   each of said plurality of data bits is communicated during a separate one of a consecutive series of bit periods; and
   each of said plurality of data bits is communicated using the steps of claim 1.

3. The method of claim 2, wherein:
   each one of said bit periods has an approximately equal length of time, and
   said plurality of data bits are communicated within a transmission period that is approximately equal to a sum of said series of bit periods.

4. A method of clock independent communication of a plurality of time related data bits on pairs of communications lines between devices, comprising the steps of:
   indicating, on a first pair of communication lines comprising first and second communication lines, a transmission and a value of a first one of said data bits by state transitions between values occurring on one of said first or second communication lines interconnecting said devices, a value of the data bit determined by an identity of a transitioned data line and the transmission of the data bit triggered by the transition of the data line; and
   indicating, on a second pair of communication lines comprising third and fourth communication lines, a transmission and a value of a second one of said data bits by state transitions between values occuring on one of said third or fourth communication lines interconnecting said devices, the value of the data bit determined by an identity of a transitioned data line and the transmission of the data bit triggered by the transition of the data line; wherein
   said plurality of time related data bits are data bits that are simultaneously communicated from a data source.

5. The method of claim 4, further comprising the steps of:
   indicating the value of additional time related bits, time related to said first and second bits by transitioning a signal on additional separate pairs of communication lines.

6. The method of claim 4, further comprising the steps of:
   transmitting sequential data bits on each of said pairs of communications lines, by transitioning a signal on one line of each of said pairs of communication lines, wherein
   each transition of one of said lines indicates the transmission of an additional sequential bits and each said sequential bit is associated with a sequential set of time related sequential data bits that are simultaneously communicated from a data source.

7. The method of claim 4, further comprising the step of:
   sequentially communicating a multitude of said plurality of data bits, wherein each of said multitude is communicated during a separate one of a consecutive series of bit periods; and
   each of said multitude is communicated using the steps of claim 4.

8. The method of claim 7, wherein:
   each one of said series of bit periods has an approximately equal length of time and said multitude of said plurality of data bits are communicated within a transmission period that is approximately equal to a sum of said series of bit periods.

9. A method of communicating a plurality of time related data bits on pairs of communications lines between devices, comprising the steps of:
   indicating, on a first pair of communication lines comprising first and second communication lines, a first value of a first one of said data bits by state transitions between values occurring on one of said first or second communication lines interconnecting said devices; and
   indicating, on a second pair of communication lines comprising third and fourth communication lines, a first value of a second one of said data bits by state transitions between values occurring on one of said third or fourth communication lines interconnecting said devices, wherein
   said plurality of time related data bits are data bits that are simultaneously communicated from a data source;
   receiving each of said plurality of time related data bits in a separate register of an elastic buffer;
   buffering said plurality of time related data bits in said elastic buffer until all of said plurality of time related data bits have been received by said elastic buffer; and
   outputting all of said plurality of time related data bits simultaneously from said elastic buffer.

10. The method of claim 9, wherein:
    said elastic buffer synchronizes said output of said plurality of time related data bits irrespectively of any temporal difference in the receipt of respective ones of said plurality of time related data bits.

11. Apparatus for communicating a data bit between devices where the communicating is not dependent upon a clock signal, comprising:
    a first communication line interconnecting said devices for indicating a transmission of a first value of said data bit by a state transition between values independent of any clock, and
    a second communication line interconnecting said devices for indicating a transmission of a second value of said data bit by said state transitions between values independent of any clock, wherein
    only one of said first and second communication lines may transition states between said values for said data bit communication at any one time.

12. Apparatus for communicating a plurality of time related data bits between devices, comprising:
    a first pair of communications lines interconnecting said devices, comprising:
    first and second communication lines, wherein a first value of a first one of said time related data bits is indicated by state transitions between values occurring on one of said first or second communication lines interconnecting said devices independent of any clock signal; and a second pair of communication lines interconnecting said devices, comprising:

third and fourth communication lines, wherein a first value of a second one of said data bits is indicated by state transitions between values occuring on one of said third or fourth communication lines interconnecting said devices independent of any clock signal, wherein said plurality of time related data bits are data bits that are simultaneously communicated from a data source.

13. The apparatus of claim 12, further comprising:

additional separate pairs of communication lines for indicating the value of additional time related bits.

14. Apparatus for communicating a plurality of time related data bits between devices, comprising:

a first pair of communications lines interconnecting said devices, comprising:

first and second communication lines, wherein a first value of a first one of said time related data bits is indicated by a state transition between values occurring on one of said first or second communication lines interconnecting said devices; and a second pair of communication lines interconnecting said devices, comprising:

third and fourth communication lines, wherein a first value of a second one of said data bits is indicated by a state transition between values occurring on one of said third or fourth communication lines interconnecting said devices, wherein said plurality of time related data bits are data bits that are simultaneously communicated from a data source;

an elastic buffer having a separate receiving register for each of said plurality of time related data bits; and for buffering said plurality of time related data bits in said elastic buffer until all of said plurality of time related data bits have been received by said elastic buffer; and for outputting all of said plurality of time related data bits simultaneously from said elastic buffer.

15. The apparatus of claim 14, wherein:

said elastic buffer synchronizes said output of said plurality of time related data bits irrespectively of any temporal difference in the receipt of respective ones of said plurality of time related data bits.

* * * * *